United States Patent [19]
Plummer

[11] Patent Number: 6,045,305
[45] Date of Patent: Apr. 4, 2000

[54] HELICALLY FLUTED TWIST DRILL DEVICE

[76] Inventor: Jerald D. Plummer, 5267 Swanson Rd., Roscoe, Ill. 61073

[21] Appl. No.: 08/940,347

[22] Filed: Sep. 30, 1997

[51] Int. Cl.[7] .................................................... B23B 51/00
[52] U.S. Cl. ............................ 408/230; 408/59; 408/226
[58] Field of Search ................................ 408/57, 59, 226, 408/227, 230

[56] References Cited

U.S. PATENT DOCUMENTS

| | | | |
|---|---|---|---|
| 4,134,704 | 1/1979 | Jackley et al. | 408/57 |
| 4,826,368 | 5/1989 | Tikal et al. | 405/230 |
| 4,898,503 | 2/1990 | Barish | 408/230 |
| 4,932,815 | 6/1990 | Krauss | 408/227 |
| 5,046,902 | 9/1991 | Zubov et al. | 408/230 |

FOREIGN PATENT DOCUMENTS

3709647A1 10/1988 Germany ................................ 408/57

*Primary Examiner*—Daniel W. Howell
*Assistant Examiner*—Monica Smith
*Attorney, Agent, or Firm*—David J. Archer

[57] ABSTRACT

A helically fluted twist drill device is disclosed for cutting materials. The device comprises a shank having a first and a second end. A cylindrical core has a first diameter and a first and a second extremity, the core extending coaxially relative to the shank and from the second end of the shank, the second extremity defining a point. At least three portions extend helically outwardly away from the core so that the portions define a second diameter. The arrangement is such that adjacent portions define therebetween a surface of a helical flute. Each of the portions further define a helical bore connected to a source of a cutting fluid for permitting a flow of the cutting fluid through the bore from the shank towards the point. The arrangement is such that in use of the device, the cutting fluid conveys the materials from the vicinity of the point through each flute towards the shank. The first diameter has a dimension within a first range which is 20–35% of a dimension of the second diameter. Also, the surface is machined such that intersection of the portions with any normal extending outwardly from the surface is inhibited.

15 Claims, 4 Drawing Sheets

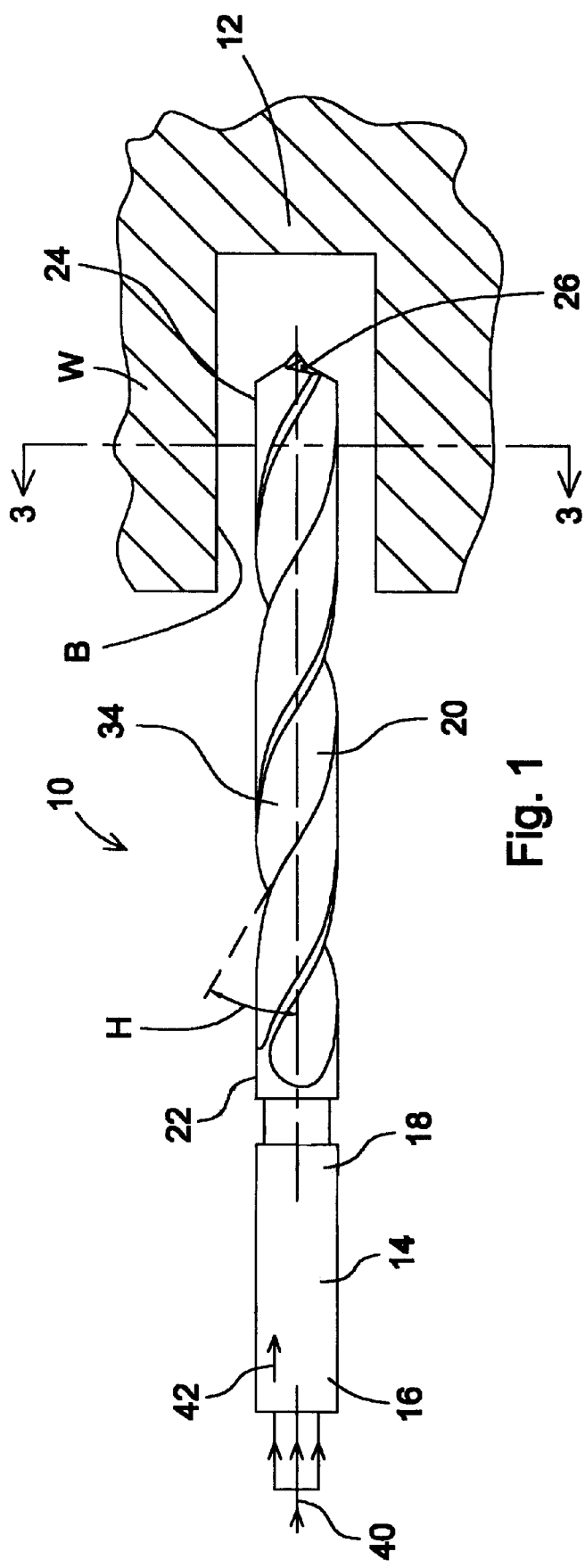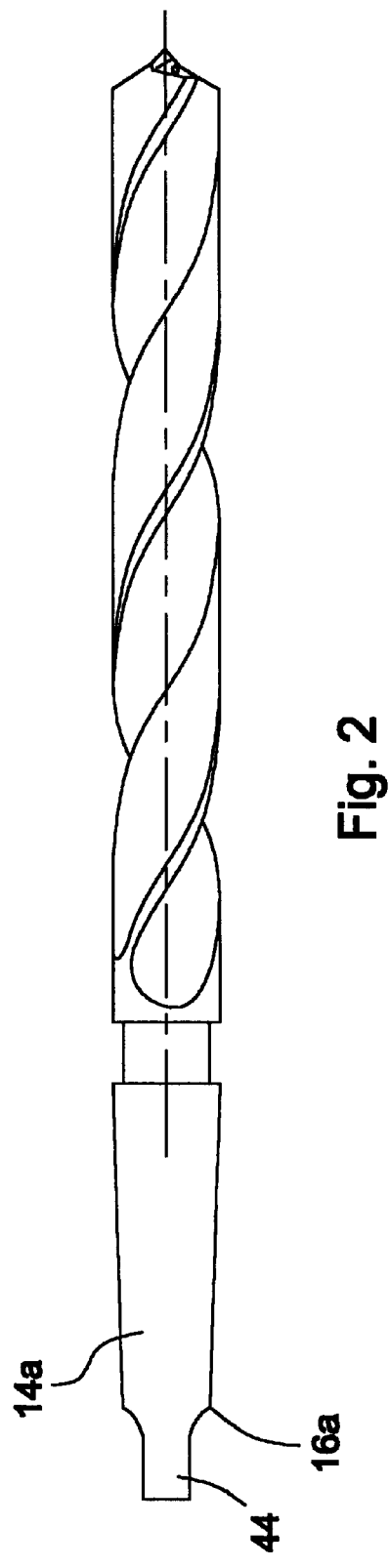
Fig. 1
Fig. 2

HELICALLY FLUTED TWIST DRILL DEVICE

BACKGROUND OF THE INVENTION

1. Field of the Invention

The present invention relates to a helically fluted twist drill device.

More specifically, the present invention relates to a helically fluted twist drill device for cutting materials.

2. Information Disclosure Statement

Three-flute twist drills otherwise known as core drills are primarily used for enlarging and finishing drilled, cast or punched holes. Generally, such three-flute drills will not produce original holes.

Some three-flute drills are manufactured by means of a process which includes the step of providing a cylindrical blank which defines three equidistantly spaced longitudinally extending flutes and bores.

The cylindrical blank or rod is extruded when it is still in its soft state. The extruded material is then heat treated or sintered to bring such material to its final state of hardness.

Subsequently, a helical flute is machined between adjacent bores such that the resultant machined twist drill includes three flutes or channels which extend helically from a shank portion disposed adjacent to one end of the blank to a second end of the blank.

Next, the second end of the blank is machined to provide a point.

The bores are provided so that a cutting fluid under pressure can be fed through the twist drill while the drill is rotating at high speed. The cutting fluid flows from the shank to the point so that lubrication of the twist drill within the drilled hole is accomplished. Also, the cutting fluid flows from the point of the twist drill back through the flutes. Such flow of the cutting fluid from the point through the flutes helps to convey the cut material from the point towards the shank of the twist drill. This process is known as chip evacuation.

Accordingly, it is desirable that the cross sectional area of the flutes or channels be as large as possible so as to avoid clogging of the same by chips or material being drilled during the drilling operation.

Nevertheless, when large flutes are machined, there is a tendency to cut the flute in such a way that the surface of the flute exposes the adjacent bore. If such exposure occurs, the resultant twist drill will be useless.

Also, in order to machine the flutes, various shape grinding wheels have been required as in the past it has often been necessary to use special shape grinding wheels to generate the flute form needed for that particular drill size. The use of special wheels can be very expensive such as $300.00–$400.00 per wheel. Also, 12–15 different wheels are required in order to make the various drill sizes.

Additionally, the operation of truing the form of the grinding wheels as such wheels wear is labor intensive.

The present invention overcomes the aforementioned problems by providing an arrangement in which twist drills of various sizes can be machined using a single straight grinding wheel such as a type IAI grinding wheel with a 1/32 inch–1/16 inch radius.

In the grinding operation according to the present invention, the axis of the grinding wheel is disposed at an approach angle within the range 2–4 degrees and preferably 2–4 degrees relative to the longitudinal axis of the twist drill.

Therefore it is a primary objective of the present invention to provide a fluted twist drill and a method of manufacturing the same which overcomes the problems associated with the prior art arrangements.

Another object of the present invention is the provision of a fluted twist drill having at least three flutes each of which define a flute surface which when taken in a section normal to the longitudinal axis of the twist drill is of generally S-shaped configuration so that hooking the flutes is inhibited, that is the flutes have no undercut areas.

A further object of the present invention is the provision of a fluted twist drill having at least three flutes which can be manufactured in various sizes using a standard straight grinding wheel.

Other objects and advantages of the present invention will be readily apparent to those skilled in the art by a consideration of the detailed description contained hereinafter taken in conjunction with the annexed drawings.

SUMMARY OF THE INVENTION

The present invention relates to a helically fluted twist drill device for cutting materials and a method for making such a device. The device includes a shank having a first and a second end. A cylindrical core has a first diameter and a first and a second extremity, the core extending coaxially relative to the shank and from the second end of the shank. The second extremity of the core defines a point. At least three portions extend helically outwardly away from the core so that the portions define a second diameter. The arrangement is such that adjacent portions define therebetween a surface of a helical flute.

Each of the portions further define a helical bore connected to a source of a cutting fluid for permitting a flow of the cutting fluid through the bore from the shank towards the point. The arrangement is such that in use of the device, the cutting fluid conveys the materials from the vicinity of the point through each flute towards the shank.

The first diameter has a dimension within a first range which is 20–35% of a dimension of the second diameter.

Also, the surface is machined such that intersection of the portions with any normal extending outwardly from the surface is inhibited.

Many modifications and variations of the present invention will be readily apparent to those skilled in the art by a careful consideration of the detailed description of a preferred embodiment of the present invention described hereinafter taken in conjunction with the annexed drawings. However, such modifications and variations fall within the spirit and scope of the present invention as defined by the appended claims.

BRIEF DESCRIPTION OF THE DRAWINGS

FIG. 1 is a side elevational view of a helically fluted twist drill according to the present invention;

FIG. 2 is a side elevational view of a helically fluted twist drill according to an alternative embodiment of the present invention;

Similar reference characters refer to similar parts throughout the various views of the drawings.

DETAILED DESCRIPTION OF THE DRAWINGS

Figure 3:
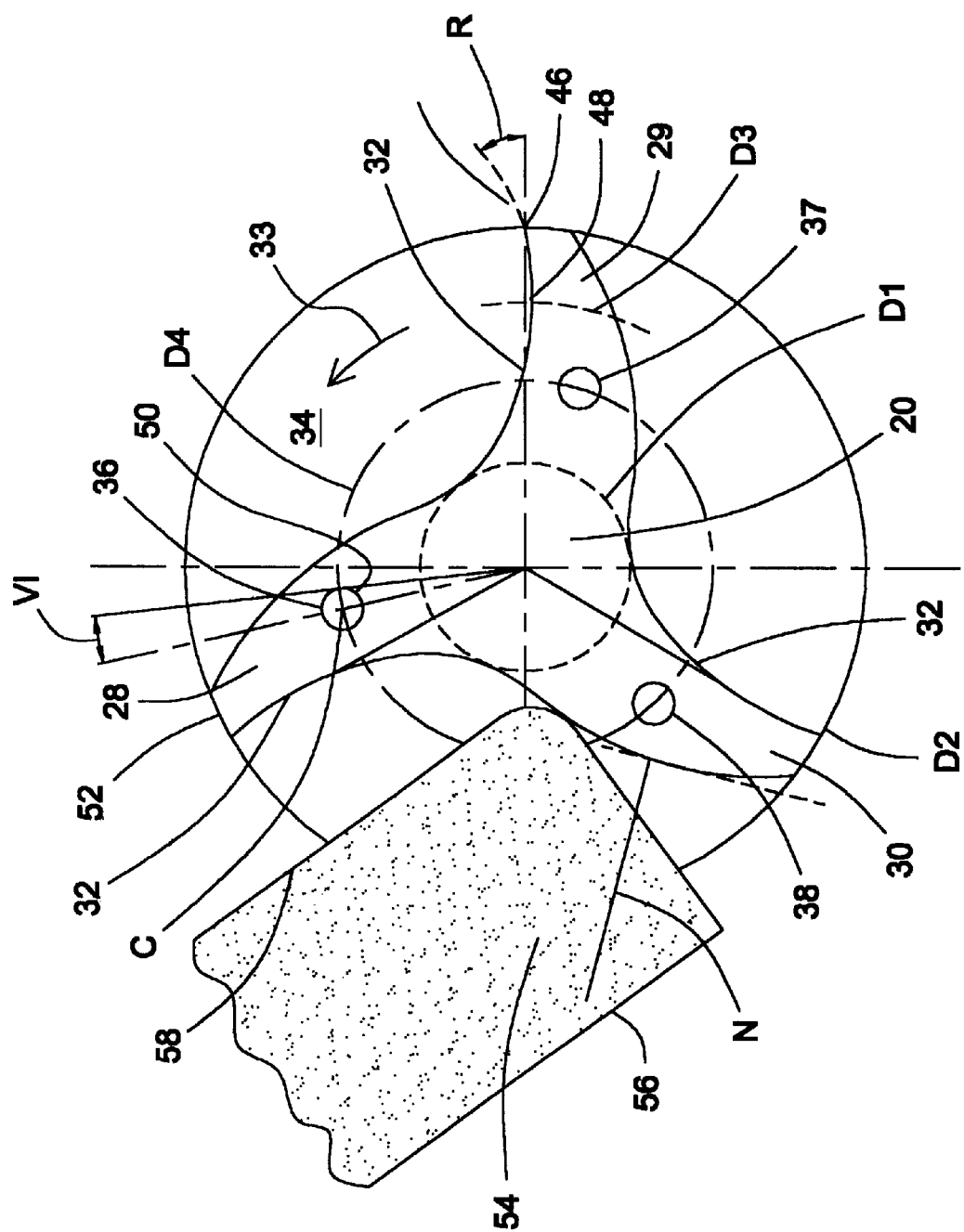
FIG. 3 is an enlarged sectional view taken on the line 3—3 of FIG. 1.

FIG. 1 is a side elevational view of a helically fluted twist drill device generally designated 10 according to the present invention. As shown in FIG. 1, the helically fluted twist drill device 10 is designed for cutting materials 12 and particularly for finishing a bore B defined by a workpiece W. The twist drill device 10 includes a shank 14 having a first and a second end 16 and 18 respectively. A cylindrical core 20 has a first diameter D1 and a first and a second extremity 22 and 24 respectively. The core 20 extends coaxially relative to the shank 14 and from the second end 18 of the shank 14. The second extremity 24 of the core 20 defines a point 26.

At least three portions 28, 29 and 30 respectively extend helically outwardly away from the core 20 so that the portions 28–30 define a second diameter D2. The arrangement is such that adjacent portions 28–29, 29–30 and 30–28 define therebetween a surface 32 of a helical flute 34. Each of the portions 28–30 further define a helical bore 36, 37 and 38 respectively connected to a source of a cutting fluid 40 for permitting a flow as indicated by the arrow 42 of the cutting fluid 40 through the bore 36 from the shank 14 towards the point 26.

In use of the twist drill device 10, the cutting fluid 40 conveys the cut materials 12 from the vicinity of the point 26 through each flute 34 towards the shank 14. The first diameter D1 has a dimension within a first range I which is 20–35% and preferably 25–30% of a dimension of the second diameter D2. Also, the surface 32 is machined such that intersection of the portions 28–30 with any normal extending outwardly from the surface 32 is inhibited.

In a more specific embodiment of the present invention the shank 14 is of cylindrical configuration.

In another embodiment of the present invention as shown in FIG. 2, the shank 14a is tapered.

Also, as shown in FIG. 2, a tang 44 extends from the first end 16a of the shank 14a.

Also, as shown in FIG. 1, the first extremity 22 of the core 20 extends from the second end 18 of the shank 14.

Additionally, as shown in FIG. 3 which is an enlarged sectional view taken on the line 3—3 of FIG. 1, the surface 32 in cross section is of sinusoidal configuration.

More specifically, the surface 32 in cross section from a first location 46 on the second diameter D2 defines a rake angle R within a second range II which is 1.5–2.5 degrees and preferably 2 degrees from a radius of the second diameter D2 passing through the first location 46.

More particularly, the rake angle R is such that during rotation of the device 10, the surface 32 adjacent to the second diameter D2 is of scoop shaped configuration for assisting in cutting and conveying the materials 12 in a direction as indicated by the arrow 33 from the point 26 towards the shank 14.

Furthermore, the scoop shaped configuration of the surface 32 is deepest at a second location 48 which is disposed between the first and second diameter D1 and D2 respectively. The second location 48 is disposed on a third diameter D3, the third diameter D3 being concentric with the first and second diameter D1 and D2 respectively. The third diameter D3 has a dimension which is within a third range III which is 8–15% and preferably 10–13% less than a dimension of the second diameter D2.

In a preferred embodiment of the present invention, the portions 28–30 extend helically along the core 20, with each portion 28-30 having a helix angle H within a fourth range IV which is 25–35 degrees and preferably 30 degrees.

Each bore 36 has a center C located on a fourth diameter D4. The fourth diameter D4 which is concentric to the other diameters D1–D3 has a dimension within a fifth range V which is 45–55% and preferably 47–53% of the dimension of the second diameter D2.

More specifically, each center C is located on the fourth diameter D4 and the bore 36 has a wall 50. The arrangement is such that a first radius of the device 10 extending through the center C and a second radius tangent to the wall 50 define therebetween an angle within a sixth range VI which is 8–12 degrees and preferably 10 degrees.

Adjacent surfaces of adjacent flutes define therebetween a land 52 which extends along a portion of the second diameter D2. Each of the lands 52 is within a seventh range VII which is 8–12 mm and preferably 10 mm.

The twist drill device 10 defines an angle of approach within an eighth range VIII which is 0.5–4 degrees and preferably 2–4 degrees.

In the preferred embodiment of the present invention, the drill device 10 is machined to a combination of:

a first range I
a second range II
a third range III
a fourth range IV
a fifth range V
a sixth range VI
a seventh range VII
an eighth range VIII.

The ranges I–VIII being as described hereinbefore.

Figure 4:
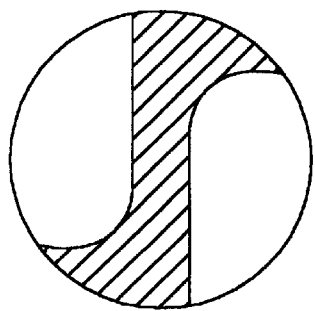
FIG. 4. is a cross sectional view of a conventional prior art two flute twist drill.
Figure 5:
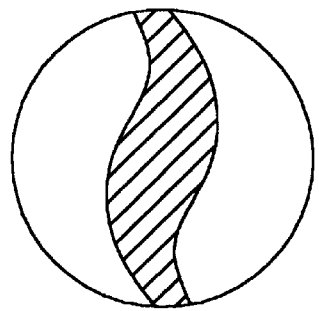
FIG. 5 is a cross sectional view of a parabolic prior art two flute twist drill.
Figure 6:
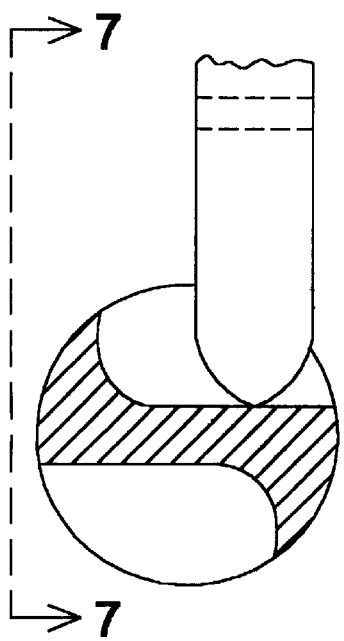
FIG. 6 is a cross sectional view of a conventional prior art two flute twist drill showing a portion of the grinding wheel with axis of rotation disposed normal to the longitudinal axis of the drill.
Figure 7:
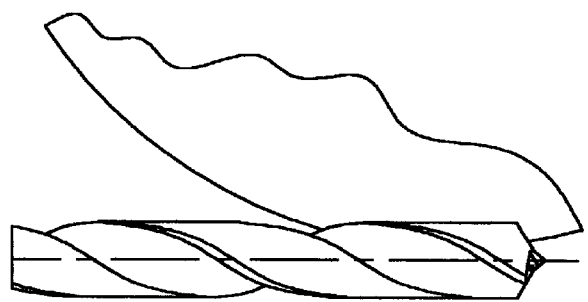
FIG. 7 is a side view taken on the line 7—7 of FIG. 6.

FIG. 4. is a cross sectional view of a conventional prior art two flute twist drill;

FIG. 5 is a cross sectional view of a parabolic prior art two flute twist drill;

FIG. 6 is a cross sectional view of a conventional prior art two flute twist drill showing a portion of the grinding wheel with axis of rotation disposed normal to the longitudinal axis of the drill;

FIG. 7 is a side view taken on the line 7—7 of FIG. 6; and

Figure 8:
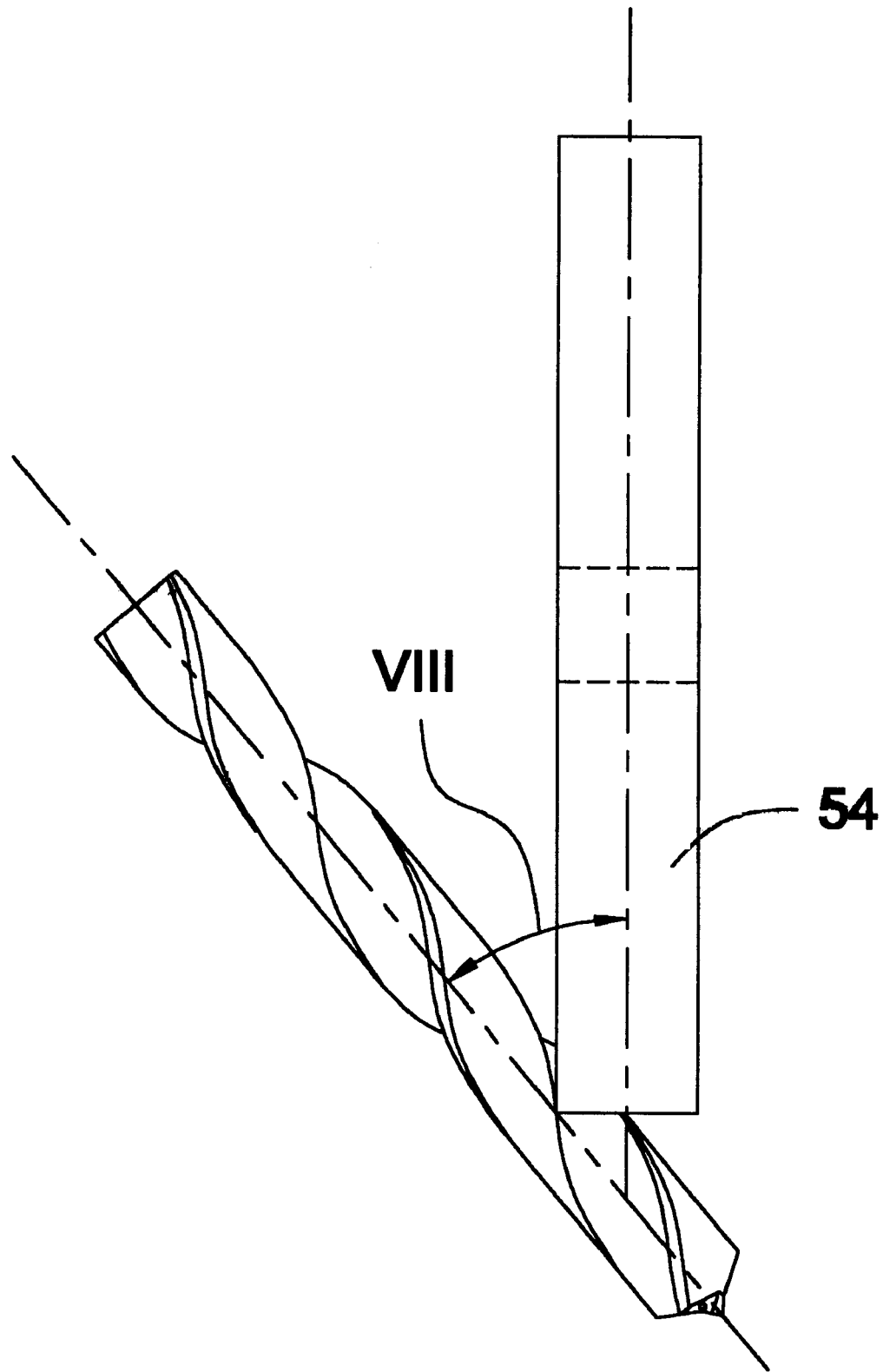
FIG. 8 is a side view of a parabolic three flute twist drill according to the present invention showing the angle of approach of the grinding wheel relative to the drill.

FIG. 8 is a side view of a parabolic three flute twist drill according to the present invention showing the angle of approach VIII of the grinding wheel 54 relative to the drill 10.

The method according to the present invention includes grinding at least three helical flutes 32 between adjacent portions 28–30 by means of a standard three inch straight IAI wheel 54 as shown in FIG. 3.

More specifically, because the side walls 56 and 58 of the wheel 54 are parallel and because no normal N extending outwardly from the surface 32 intersects any of the portions 28–30, grinding of the flutes can be accomplished regardless of the size of the drill device 10.

The key features of the present invention include the provision of a twist drill having:

1) Three parabolic flutes for faster penetration. (A two flute drill does not penetrate as fast as a three flute drill.)
2) Through the tool coolant, for cooling, lubrication and chip evacuation.

Two of the biggest problems with drilling are the inability to eject chips fast enough and the problem of getting coolant to the point of the cut deep into the hole, which causes premature tool failure due to heat.

More specifically, in the drilling art the term "parabolic flute form" as used herebefore is used to describe a flute the surface of which when taken in a section normal to the longitudinal axis of the drill is of generally S-shaped that is sinusoidal configuration.

The aforementioned parabolic flute form provides more area for chip removal when compared with the more standard flute shape.

The present invention by a combination of machining angles and grinding ranges provides a twist drill having exceptionally large flute areas for the passage therethrough of cut materials so that drilling operations can be performed at extremely high speeds.

What is claimed is:

1. A helically fluted twist drill device for cutting materials, said device comprising:
   a shank having a first and a second end;
   a cylindrical core having a first diameter and a first and a second extremity, said core and said shank having a common axis of rotation, said core extending coaxially relative to said shank and from said second end of said shank, said second extremity defining a point;
   at least three portions extending helically outwardly away from said core so that said portions define a second diameter, the arrangement being such that adjacent portions define therebetween a surface of a helical flute;
   each of said portions further defining a helical bore connected to a source of a cutting fluid for permitting a flow of the cutting fluid through said bore from said shank towards said point, the arrangement being such that at least three bores extend from said first end of said shank to said point so that in use of said device, the cutting fluid conveys the materials from the vicinity of said point through each flute towards said shank;
   said first diameter having a dimension within a first range which is 20–35% of a dimension of said second diameter; and
   said surface being machined such that each surface is of S-shaped configuration when viewed from said first end towards said point in a direction parallel to said common axis; and
   said surface in cross section from a first location on said second diameter defines a positive rake angle from a radius of said second diameter passing through said first location.

2. A helically fluted twist drill device as set forth in claim 1 wherein said shank is of cylindrical configuration.

3. A helically fluted twist drill device as set forth in claim 1 wherein said shank is tapered.

4. A helically fluted twist drill device as set forth in claim 1 further including:
   a tang extending from said first end of said shank.

5. A helically fluted twist drill device as set forth in claim 1 wherein said first extremity of said core extends from said second end of said shank.

6. A helically fluted twist drill device as set forth in claim 1 wherein
   said surface in cross section is of sinusoidal configuration.

7. A helically fluted twist drill device as set forth in claim 1 wherein said positive rake angle is within a second range which is 1.5–2.5 degrees.

8. A helically fluted twist drill device as set forth in claim 7 wherein said rake angle is such that during rotation of said device, said surface adjacent to said second diameter is of scoop shaped configuration for assisting in cutting and conveying the materials towards said shank.

9. A helically fluted twist drill device for cutting materials, said device comprising:
   a shank having a first and a second end;
   a cylindrical core having a first diameter and a first and a second extremity, said core and said shank having a common axis of rotation, said core extending coaxially relative to said shank and from said second end of said shank, said second extremity defining a point;
   at least three portions extending helically outwardly away from said core so that said portions define a second diameter, the arrangement being such that adjacent portions define therebetween a surface of a helical flute;
   each of said portions further defining a helical bore connected to a source of a cutting fluid for permitting a flow of the cutting fluid through said bore from said shank towards said point, the arrangement being such that at least three bores extend from said first end of said shank to said point so that in use of said device, the cutting fluid conveys the materials from the vicinity of said point through each flute towards said shank;
   said first diameter having a dimension within a first range which is 20–35% of a dimension of said second diameter;
   said surface being machined such that each surface is of S-shaped configuration when viewed from said first end towards said point in a direction parallel to said axis;
   said surface in cross section from a first location on said second diameter defining a rake angle within a second range which is 1.5–2.5 degrees from a radius of said second diameter passing through said first location;
   said rake angle being such that during rotation of said device, said surface adjacent to said second diameter is of scoop shaped configuration for assisting in cutting and conveying the materials towards said shank; and
   said scoop shaped configuration of said surface being deepest adjacent to a second location disposed between said first and second diameter, said second location being disposed on a third diameter, said third diameter being concentric with said first and second diameter, said third diameter having a dimension which is within a third range which is 8–15% less than a dimension of said second diameter.

10. A helically fluted twist drill device as set forth in claim 2 wherein said portions extend helically along said core, each portion having a helix angle within a fourth range which is 25–35 degrees.

11. A helically fluted twist drill device for cutting materials, said device comprising:
    a shank having a first and a second end;
    a cylindrical core having a first diameter and a first and a second extremity, said core and said shank having a common axis of rotation, said core extending coaxially relative to said shank and from said second end of said shank, said second extremity defining a point;
    at least three portions extending helically outwardly away from said core so that said portions define a second diameter, the arrangement being such that adjacent portions define therebetween a surface of a helical flute;
    each of said portions further defining a helical bore connected to a source of a cutting fluid for permitting a flow of the cutting fluid through said bore from said shank towards said point, the arrangement being such that at least three bores extend from said first end of said shank to said point so that in use of said device, the cutting fluid conveys the materials from the vicinity of said point through each flute towards said shank;

said first diameter having a dimension within a first range which is 20–35% of a dimension of said second diameter;

said surface being machined such that each surface is of S-shaped configuration when viewed from said first end towards said point in a direction parallel to said axis; and each bore has a center located on a fourth diameter, said fourth diameter having a dimension within a fifth range which is 45–55% of said dimension of said second diameter.

12. A helically fluted twist drill device as set forth in claim 1 wherein each bore has a center located on a fourth diameter, said bore having a wall, the arrangement being such that a first radius of said device extending through said center and a second radius tangent to said wall define therebetween an angle within a sixth range which is 8–12 degrees.

13. A helically fluted twist drill device as set forth in claim 1 wherein adjacent surfaces of adjacent flutes define therebetween a land which extends along a portion of said second diameter, said land being within a seventh range which is 8–12 mm.

14. A helically fluted twist drill device as set forth in claim 1 wherein said twist drill defines an angle of approach within an eighth range which is 0.5–4 degrees, said angle of approach being an angle defined between said common axis and a plane disposed normal to an axis of rotation of a grinding wheel used for grinding said drill.

15. A helically fluted twist drill device for cutting materials, said device comprising:

a shank having a first and a second end;

a cylindrical core having a first diameter and a first and a second extremity, said core and said shank having a common axis of rotation, said core extending coaxially relative to said shank and from said second end of said shank, said second extremity defining a point;

at least three portions extending helically outwardly away from said core so that said portions define a second diameter, the arrangement being such that adjacent portions define therebetween a surface of a helical flute;

each of said portions further defining a helical bore connected to a source of a cutting fluid for permitting a flow of the cutting fluid through said bore from said shank towards said point, the arrangement being such that at least three bores extend from said first end of said shank to said point so that in use of said device, the cutting fluid conveys the materials from the vicinity of said point through each flute towards said shank;

said first diameter having a dimension within a first range which is 20–35% of a dimension of said second diameter;

said surface being machined such that each surface is of S-shaped configuration when viewed from said first end towards said point in a direction parallel to said common axis; and wherein said drill device is machined to a combination of:

a first diameter which is the diameter of said core, said first diameter being within a first range which is: 25–30% of a second diameter, said second diameter being a diameter of said portions;

a positive rake angle which is within a second range which is: 1.5–2.5 degrees;

a third diameter which is a diameter of said surface which is deepest, said third diameter being within a third range which is: 10–13% less than said second diameter;

a helix angle which is within a fourth range which is within the range: 25–35 degrees;

a fourth diameter which is a diameter of a circle passing through a center of each bore, said fourth diameter being within a fifth range which is: 47–53% of said second diameter;

an angle defined between a first radius extending through a center of said bore and a second radius tangent to a wall defined by said bore, said angle being within a sixth range which is: 8–12 degrees;

adjacent surfaces of adjacent flutes defining therebetween a land, said land being within a seventh range which is: 8–12 mm; and an angle of approach which is an angle defined between said common axis and a plane disposed normal to an axis of rotation of a grinding wheel used to grind said drill, said angle of approach being within an eighth range which is: 0.5–4 degrees.

* * * * *